United States Patent [19]

Levin et al.

[11] Patent Number: 4,994,675
[45] Date of Patent: Feb. 19, 1991

[54] METHOD AND APPARATUS FOR CHECKING CONTINUITY OF OPTIC TRANSMISSION

[75] Inventors: Paul Levin, Manhattan Beach, Calif.; Barry Minnerly, Rowayton, Conn.

[73] Assignees: Rebo Research, Inc., New York, N.Y.; Meret, Inc., Santa Monica, Calif.

[21] Appl. No.: 345,138

[22] Filed: Apr. 28, 1989

[51] Int. Cl.⁵ .............................................. G02B 27/00
[52] U.S. Cl. ................................. 250/551; 455/617; 356/73.1
[58] Field of Search ............... 250/227, 551; 455/607, 455/610, 612, 617; 350/96.23; 340/870.01, 504, 505; 356/73.1

[56] References Cited

U.S. PATENT DOCUMENTS

| | | | |
|---|---|---|---|
| 4,262,366 | 4/1981 | Eumurian | 455/617 |
| 4,326,298 | 4/1982 | Fromm et al. | 455/617 |
| 4,393,518 | 7/1983 | Briley | 455/617 |
| 4,596,049 | 6/1986 | Rizzotti, III | 455/617 |
| 4,637,072 | 1/1987 | Hellström | 455/607 |
| 4,677,982 | 7/1987 | LLinas et al. | 455/617 |
| 4,691,384 | 9/1987 | Jobe | 455/617 |
| 4,710,977 | 12/1987 | Lemelson | 455/612 |
| 4,817,204 | 3/1989 | Jannelli et al. | 455/617 |
| 4,833,668 | 5/1989 | Rowley et al. | 455/607 |

Primary Examiner—David C. Nelms
Assistant Examiner—Stephone B. Allen
Attorney, Agent, or Firm—Darby & Darby

[57] ABSTRACT

An apparatus for checking continuity of fiber optic links from source to receiver before enabling the source delivers full power so as to thereby prevent eye damage to personnel and provide a supervisory signal to the system user that the link elements are intact and functioning. The apparatus includes a transmitter, a receiver and a detector for detecting that an optical transmission between the transmitter and receiver can be effected.

23 Claims, 4 Drawing Sheets

METHOD AND APPARATUS FOR CHECKING CONTINUITY OF OPTIC TRANSMISSION

BACKGROUND OF THE INVENTION

The present invention relates to a fiber optic link continuity check for single and multi-cable systems.

Transmission of information over long distances using fiber optic cables requires that powerful optical sources be used, such as laser diodes. If misused, the optical lightwave radiation from some of the more powerful optic sources can cause eye damage. While Class One laser diodes are considered safe for fiber optic link users if structured work practices are used, an uninformed user could be endangered, particularly if collimating optics, such as a magnifier, are used to view the output lightwave. Obviously, this can only occur if the fiber optic link is "open" at some point, i.e. a link discontinuity has occurred.

This optical radiation endangerment can occur if someone disconnects the wrong fiber optic cable and assumes that this cable is connected to a laser source that has been turned off. Since minute contaminants, such as sandy grit, can prevent proper coupling of a fiber optic cable to its mating connector, it is not altogether unlikely that uninformed personnel might well consider using a magnifier to look for such contaminants.

The transmission of information over a fiber optic link depends on link closure, i.e. all link elements must be in place from source to receiver. Presently, the only test to check that fiber optic link is capable of successfully transmitting information is to "try it out". If the link is a single fiber optic cable, this requires that another link (telephone cable, radio signal, or a second fiber optic cable) is used to bring the "O.K., I got the information" signal back to the information source point to determine that the link is, in fact, working properly. When several fiber optic links are connected between the first ("source") and second ("receiver") locations, this is very practical. But, when only a single fiber connects the two locations, this "backhaul" information link can be troublesome to arrange.

From the personnel safety standpoint, providing the "O.K., its working" signal (versus a "Danger, link may be open" signal) over the backhaul link may not protect a careless person, since the backhaul data monitor line may not act quickly enough to prevent harmful radiation from a powerful source emerging to damage a person's eye.

Necessarily, the backhaul line must detect the lack of information coming over the main fiber optic link so as to alarm the system supervisor that the monitored link is, in fact, open unexpectedly. If the main fiber optic link is being used to transmit data on an intermittent basis, this monitoring can be difficult.

SUMMARY OF THE INVENTION

The present invention is directed at an apparatus for and a method of detecting whether or not a fiber optic link is established for enabling transmission of information between a transmitter and a receiver by employing a power level which is less than that required by the transmitter for transmitting the information.

One aspect of the invention resides in an apparatus for and method of checking continuity of optic transmission, which includes a transmitter for transmitting information optically, a receiver for receiving the transmitted information and a detector for detecting an enabling of the transmission of information between the transmitter and the receiver. Transmission of a test signal is effected from the transmitter to the receiver at a power level which is lower than that required for transmitting the information.

It is an object of the present invention to monitor whether a fiber optic link is open or closed between a transmitter and receiver by sending out a test signal at a lower power level than required to transmit the information. The lightwave output through the fiber optic link is thereby restricted at least until successful receipt of the test signal is detected. This precautionary step substantially prevents the danger that careless or uninformed personnel may suffer eye damage from the lightwave output where the fiber optic link is open.

It is another object to provide an indication or warning to supervisory personnel when no useful information can be transmitted through the fiber optic link.

It is another object of this invention that the information source (as laser diode) lightwave output be restricted until a "link closed" signal is received, so as to substantially prevent eye damage potential to careless or uninformed personnel.

It is a further object of this invention that the "link open/link closed" monitor system provide signals to supervisory personnel, with the "link open" signal being an alarm to indicate that no useful information can be transmitted over the link.

It is yet another object of the invention to provide monitoring capability for a single fiber optic link in which all information data on the link is being sent in a single direction.

It is still another object of the invention to provide the capability of using the test signal to carry informational data, such as the framing information in a multiplex signal channel.

It is a yet still further object of the invention to provide the capability of diagnosing fiber optic link failure in the case that the cable is hooked up to the wrong equipment.

It is yet still another object of the invention to provide equipment identification to a user as regards which equipment is in communication with each other through the fiber optic link.

It is still another object to provide a significant increase in personnel safety since the monitor system detects "opening" of a fiber optic link and reduces the source power to a level that was not harmful for any conditions of use. In practice, the monitor system detects that the link was "open", and full power would never be applied until the link was properly connected, i.e. "closed".

It is still a further object for this fiber optic link "open vs. closed" checking system to provide valuable monitoring information to those using the link to send information. If the link were unexpectedly opened at any point, the monitor system would transmit a link failure (i.e. "link discontinuity") signal to the user. Thus, if the link were thought to be operational when no user information was being sent, the monitor alarm signal would indicate link failure before the link resumed sending actual information from the source to the receiver. Often, the "link broken" alarm would allow service personnel to inspect and reconnect a mistakenly-removed fiber optic connector in a timely fashion so that minimum link down-time would occur.

DESCRIPTION OF THE PREFERRED EMBODIMENT

This application incorporates by reference the subject matter of my copending application Ser. No. 345,137, entitled "Video Transmission System For Use In Fiber Optic Cable Information Link", which was filed the same day as the present application.

Figure 1:
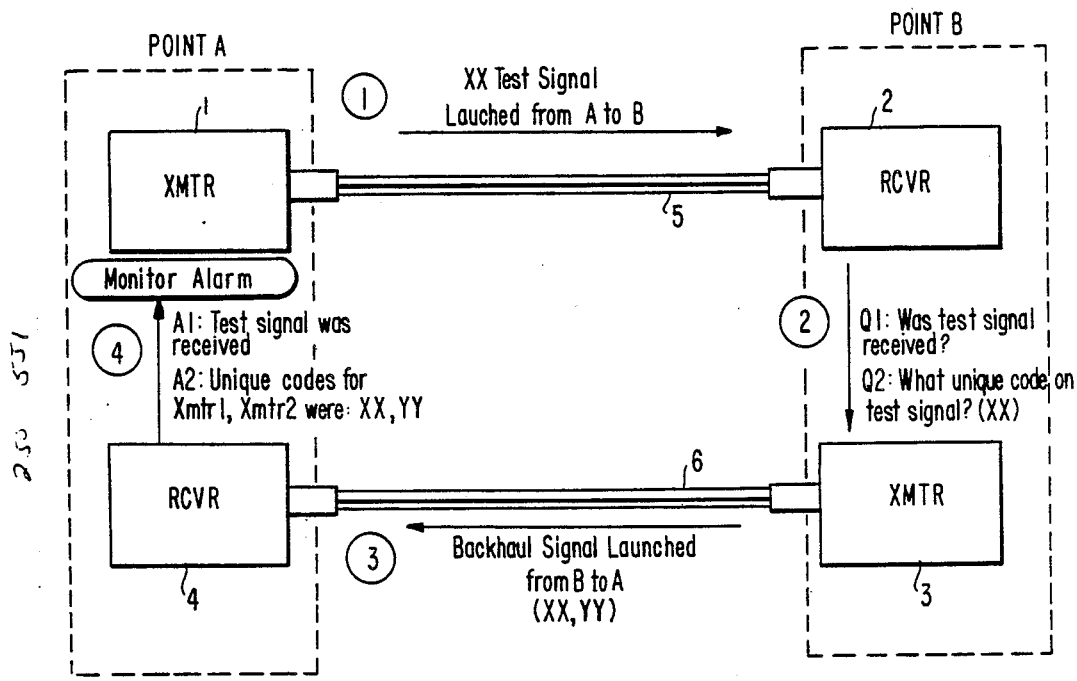
FIG. 1 is a schematic view of a first embodiment in accordance with the present invention.

FIG. 1 schematically shows a first embodiment where a separate backhaul line is available.

In a fiber optic link ensemble in which two or more information links occur with a bidirectional information flow, the first information link 5 between a transmitter 1 and a receiver may be tested and the results sent back over the second information link or backhaul line 6, that is between a backhaul transmitter 3 and backhaul receiver 4. (Note that the backhaul line may be any informational link, electrical wire, radio, or a second fiber optic cable.

In this case, the transmitter 1 with a lightwave source (for example, a laser diode 7) is always kept at low power for test startup while a test signal is being sent down the first information link 5. This test signal may be "out-of-band", so that the testing signal does not fall within the designed bandpass of the first information link 5 for carrying the desired informational data. This is practical since the test signal would usually consist of a narrow band signal, and the potentially "noisy" reception would be overcome by a bandpass filter preceding the test signal receiver. For example, while the fiber optic link may be designed to give 50 or 60 dB of signal-to-noise ratio ("SNR") to provide clean transmission of a wideband signal (as video), the test signal may be placed at a frequency somewhat higher than the upper "corner" of the link passband, and the test signal may have only a 26 to 30 dB signal-to-noise ratio. A 30 dB SNR over 30 KHz would be 0 dB SNR over 30 MHz.

Since the test signal receiver would have a second passband set on that "upper corner" frequency region, and can be narrow-band since the data rate of the test signal is low, very reliable reception of the test signal is possible.

In practice, the source laser diode would emit the test signal at low power during system "start-up" The emitted lightwave power would stay low until there was indication of a successful reception of the test signal through the backhaul line 6, thus assuring that the link between the transmitter 1 and receiver 2 is "end-to-end closed". After this backhaul "handshake", the source laser diode could then start to emit full power signals representing the link information traffic.

During the sending of the link information traffic, the laser diode source would continue to emit the test signal (since the test signal is narrow-band, this represents only a minor additional power load for the transmitter 1.

Alternately, the test signal may also be used to transmit actual informational data. As an example, for general types of "main information", the backhaul line 6 can transmit control signals. For a second example, when the main information signal is a multiplexed signal, it is practical to consider transmitting frame information signals as the test signal. The lower data rate of the frame signal allows the use of a narrow-bandpass, "out-of-band" signal placed, for example, at a frequency greater than the designed link bandpass.

The test signal receiver, then, would thus be bounded by an input narrow-band test signal filter at that "just above main band-pass" frequency. The receiver 1 would than have two functions: one, to pass the received frame information to the video control equipment via an information signal source link, and two, to act as a link monitor. Thus, if the framing information were to disappear, a "link discontinuity" alarm would be given. When there was no framing information to be sent, test source equipment could be used to generate a similar signal to replace the framing information, but coded with enough difference so that the receiver would not send spurious framing information to the video control equipment.

So that signals which originate at one station (Point A) and are received at another (Point B), and whose reception results in a backhaul signal from B to A, it is important that these backhaul signals be coded or otherwise clearly distinguishable from a back reflection of the original transmission from A to B. The insertion of unique codes (as equipment chassis serial numbers) into the test and backhaul signal transmissions will accomplish this goal. In FIG. 1, the test signal contains the unique code XX and the backhaul signal in addition has the unique code YY.

This allows the monitor equipment to perform another function. If the backhaul transmitter 3 at Point B transmits in Mode One, "standing by ready to receive test signal" as soon as it is hooked up to the A-B fiber cable, then when the Point A equipment is hooked up, the user can see a "(physical) link ready" signal. Of course, this gives no indication that the Point A emitter or the Point B receiver are working. But, if the test signal receiver were to signal successful reception of the low power test signal from Point A by changing the signal to a "low power signal received" or Mode Two signal, the Point A person could see that the emitter's and receiver's link equipment are working.

Thus, it is best to insert unique equipment identifier codings into the Mode One and Mode Two backhaul signals. The Point B equipment can always put in the unique "chassis number YY" coding in the Mode One standby signal. The Point A test signal would incorporate its unique "chassis number XX" so that when the test signal from Point A is successfully received at Point B, the Mode Two "link operating" signal could contain the unique serial numbers of both the A and B equipment (thus, XX and YY, as in FIG. 1).

In this way, should the fiber optic cable running from Point A to Point B be inadvertently connected to the wrong point B equipment, say receiver C (with coding ZZ), the backhaul signal received at Point A would contain the wrong chassis number ZZ, and in fact, could be used to determine just which "wrong equipment" the cable was hooked up to. Thus, this monitor equipment not only provides user safety and link status, it can also be used to provide link failure diagnosis.

Figure 2:
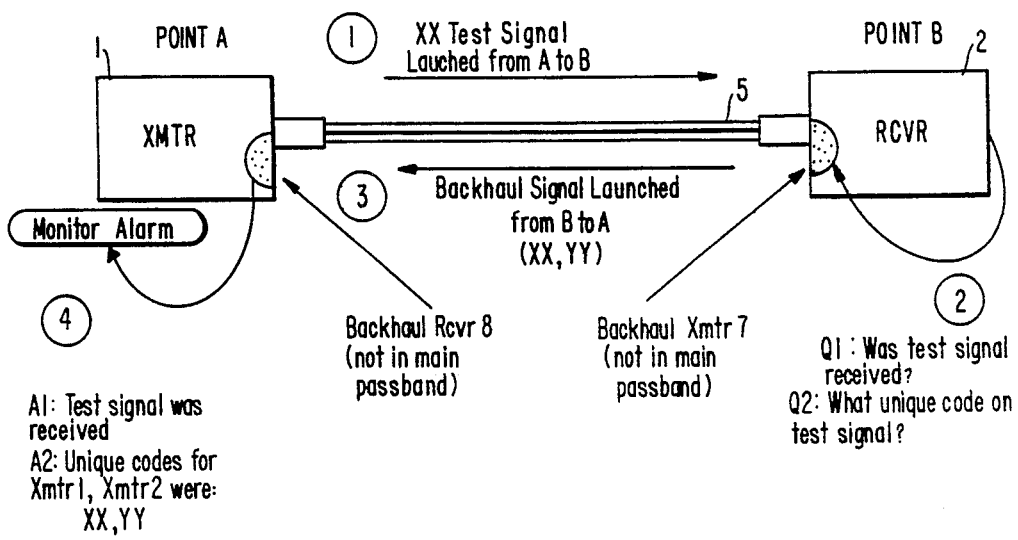
FIG. 2 is a schematic view of a second embodiment in accordance with the present invention.

FIG. 2 schematically shows a second embodiment where a single optic link is used alone.

When the information link is designed to use a single fibers to transmit information from Point A (source) to point B (receiver), a different test monitoring arrangement is made so as to provide a monitor backhaul route.

At the receiver 2, a lightwave emitter is provided that can introduce "backhaul" signals into the fiber optic cable in the reverse direction. Naturally, the backhaul light wave emitter must not block the main emitter's coupling 7 to the fiber optic cable, and thus the backhaul emitter or transmitter 7 can be "frequency selectively coupled" to the fiber optic cable.

Figure 5:
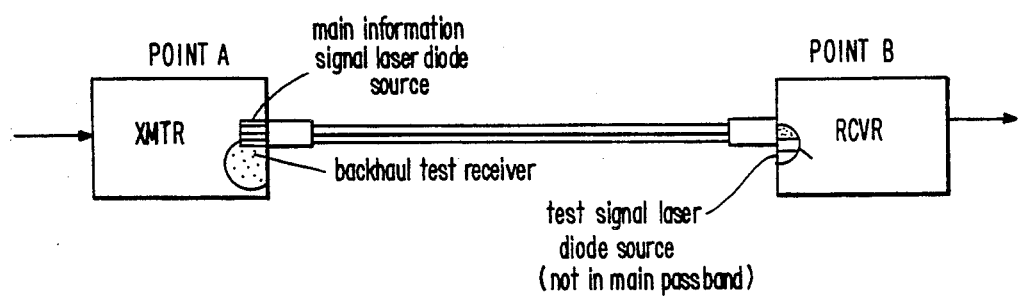
FIG. 5 is a schematic view of a portion of FIG. 2.
Figure 6:
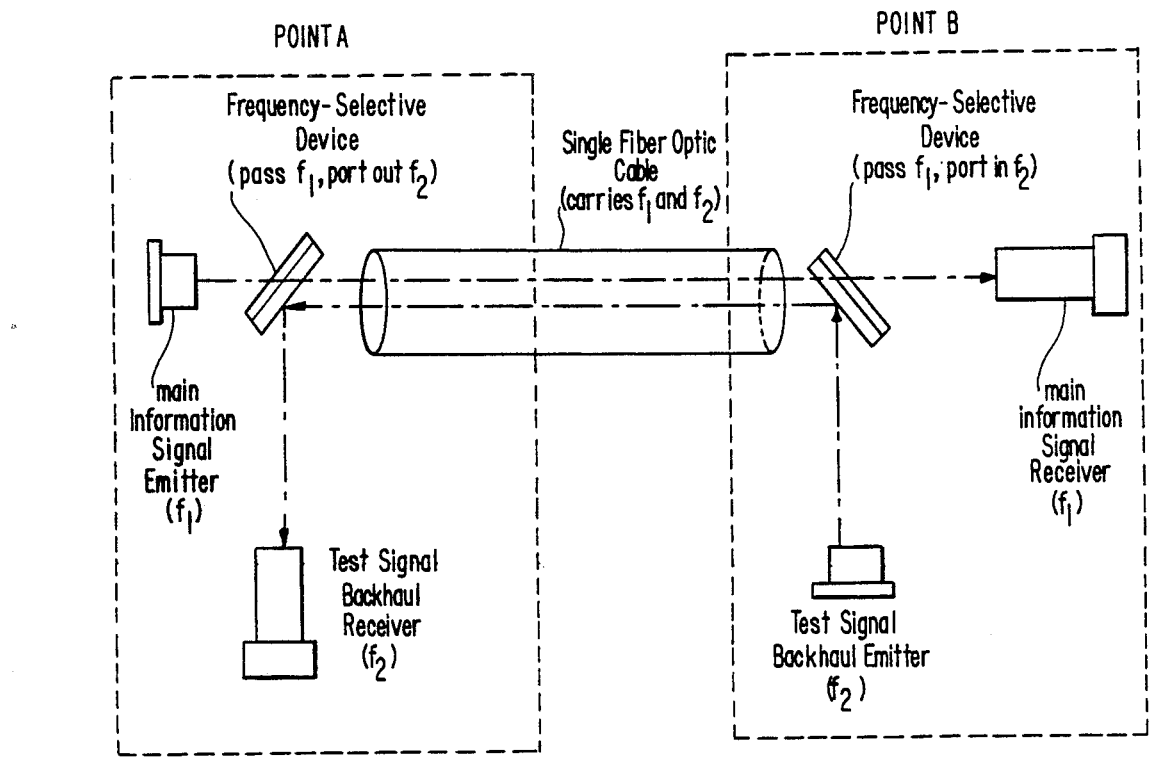
FIG. 6 is a schematic view of FIG. 5, but in more detail.

Referring briefly to FIGS. 5 and 6, the "frequency selectively coupled" arrangement is shown in greater detail.

Since the main emitter diode which carries the main informational signal operates at frequency $f_1$ (such as 830 nm), and the backhaul emitter 7 operates at a separated frequency $f_2$ (such as 1300 nm), the backhaul emitter may be coupled into the fiber by frequency selective means, such as the frequency-selective devices of FIG. 6. The mirrors shown are illustrative, and other wave (frequency) division devices (such as gratings) may be used, balancing good optical efficiency (low loss pass through $f_1$ and low loss port in or port out of $f_2$) with device cost.

So that the test backhaul signals cannot be confused with the main informational signals, the backhaul emitter 7 can utilize a very long wavelength, such as 1300 nm. As in the first embodiment, since the backhaul linkage can tolerate a very poor signal-to-noise ratio (26 to 30 dB), the coupling of the backhaul emitter 7 in the point B equipment and the backhaul receiver 8 in point A equipment (see FIG. 2) can be narrow-band filtered to operate in the face of optical coupling and a backhaul signal well outside of the main information signal bandpass in either frequency or wavelength.

For this second embodiment, a low power test signal is emitted down the fiber optic link from point A to point B. As was the case for the first embodiment, the test signal can be outside the main link bandpass. When this test signal (usually of low data rate, but with distinctive coding) is successfully received (i.e. the link is "closed" and operational), the backhaul signal at yet another frequency or at, say, a longer wavelength such as 1300 nm., is injected "backwards" into the fiber optic cable, proceeding from point B to point A. When this backhaul signal is received at point A, the source laser diode is now permitted to operate at full power to normally transmit information.

The test signal continues to be transmitted in (again, this represents only a minor additional load on the main light wave source emitter or transmitter 1). A test receiver (at point B) continues to monitor for the presence of this test signal, and if present, causes the backhaul source (as a longwave laser diode) to emit in Mode Two from point B to Point A along the fiber optic cable. If this backhaul signal should cease to be received at Point A, two things happen: the power output of the main source laser diode is immediately reduced to a "human-safe" level, and a link alarm "link open" signal is generated. In this manner, the fiber optic link operator can be sure that there is no unexpected danger to the eyes of anyone working with the link components, and that an alarm will be generated if the link becomes discontinuous. Further, if the option of embedding unique equipment coding (for the test source at Point A and the test receiver/backhaul source at Point B) is used, the link operator can even be assured that the correct equipment has been interconnected to form the operating link. Optionally, with the embedded unique coding of equipment, XX for the point A transmitter and YY for the Point B backhaul transmitter as in FIG. 1.

Figure 3:
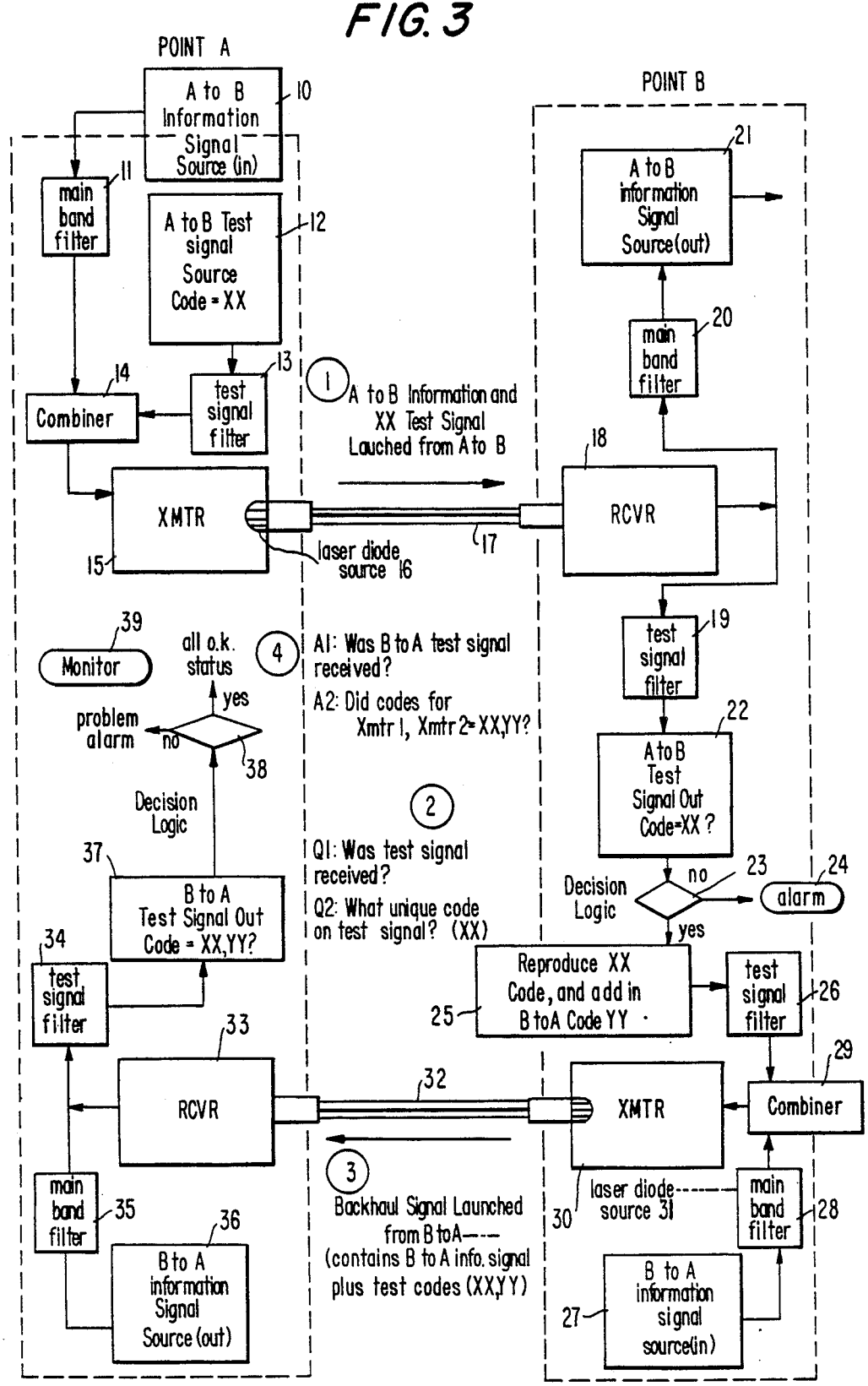
FIG. 3 is a schematic view of a third embodiment in accordance with the present invention.

FIG. 3 schematically shows a third embodiment where a separate backhaul line is available. This embodiment is similar to the first embodiment of FIG. 1 in that both have a main and backhaul transmitter, a main and backhaul receiver and a main and backhaul fiber optic link. Both embodiments transmit a test signal at low power and do not increase the power for transmitting information until successful reception of the test signal through the backhaul fiber optic link is detected. Components not depicted in FIG. 1 for the first embodiment can be found in the third embodiment of FIG. 3 and are arranged in a like manner.

An A to B information signal source 10 generates an information signal which is filtered by a main band filter 11 to eliminate extraneous noise. An A to B test signal source 12 generates a test signal which is filtered by a test signal filter 13. The test signal is coded with an equipment code, e.g. XX. Both signals are transmitted to a combiner 14 which combines the signals and sends the resulting combination signal to the transmitter 15.

Depending upon whether successful reception of the test signal has taken place, the laser diode source 16 is operated either at low-power (capable of only transmitting the test signal) or high power (capable of transmitting both the information and test signals).

Transmission of light wavelengths from the laser diode is through a primary fiber optic link 17 to a receiver 18. After leaving the receiver 18, the combination signal is filtered by test filter 19 and main band filter 20.

Only the information signal component of the combination signal filters through the main band filter 20 to reach the A to B information signal source 21 for subsequent retransmission out to video control equipment (not shown) or the like. (Although a possible variation would also allow passage of the test signal, e.g. where the test signal contains useful information.)

Only the test signal component of the combination signal filters through the test signal filter 20 to reach the A to B test signal out 22 (or test signal receiver). Decision logic 23 is provided to determine whether the test signal was received and whether the XX code has been received. If not received, an optional alarm is activated.

If received, the coding device 25 reproduces the XX code and adds on a YY code. A test signal filter 26 then filters this reproduced signal to eliminate extraneous noise.

A B to A information signal source 27 transmits an information signal that is filtered by a main band filter 28 to eliminate extraneous noise. The filtered signals transmitted from the test signal filter 26 and main band filter 28 are combined by a combiner 29, which sends the resultant combination backhaul signal to the backhaul transmitter 30.

The operating procedure is as follows:

First, a test signal (only) is sent at low power, as from Point A to Point B on the first fiber, using coding sequence XX as an identifier. When the test signal (coded XX) is received at point B, since XX is the expected code from the Point A test signal source, then a new test signal is generated (which contains the received XX sequence and a YY sequence unique to point B). This new test signal is then sent at low power to point A on the second fiber.

Reception of the new test signal containing XX and YY sequences at Point A indicates that the transmitter equipment at Point A is connected to the first fiber which is in turn connected to the desired receiver equipment at Point B, and that the transmitter equipment at Point B is connected to the second fiber which is in turn connected to the desired receiver equipment at Point A, so that the entire information link is correctly assembled and functioning.

Since the link is correctly assembled and functioning as expected, the transmitter at Point A may now go to full power and begin to transmit the A to B information signal.

Reception of the A to B information signal at full power indicates that the transmitter at Point B may go to full power, sending the B to A information signal on the second fiber to the Point A receiver equipment.

Note that the test signal XX will continue to be sent on the first fiber along with the A to B information signal and with the B to A information signal on the second fiber, so if the code sequence XX, YY should not be received at the monitor at Point A, an alarm will be made, and the Point A transmitter will immediately go to low power, sending out only the XX test sequence. When the XX test signal is not received at Point B, an alarm will be made and the Point B transmitter will immediately go to low power, transmitting only test signals. Should the fault in test signal transmission be caused by a user inadvertently trying to inspect the link, such low power will not be sufficient to cause eye damage.

Transmission of the backhaul signal from B to A is effected in a manner similar to that for the primary signal from A to B, except that transmission is to corresponding components at point A. Elements 30-38 correspond to elements 15-23, respectively. The only difference lies in that the code XX, XY is checked, rather than just code XX. This ensures that the proper equipment has received the test signal. The laser diode source 31 is operated only by low power.

The monitor 39 will enable high power of the laser diode source 16 if the code XX, YY is detected. Otherwise, only low power is allowed.

Figure 4:
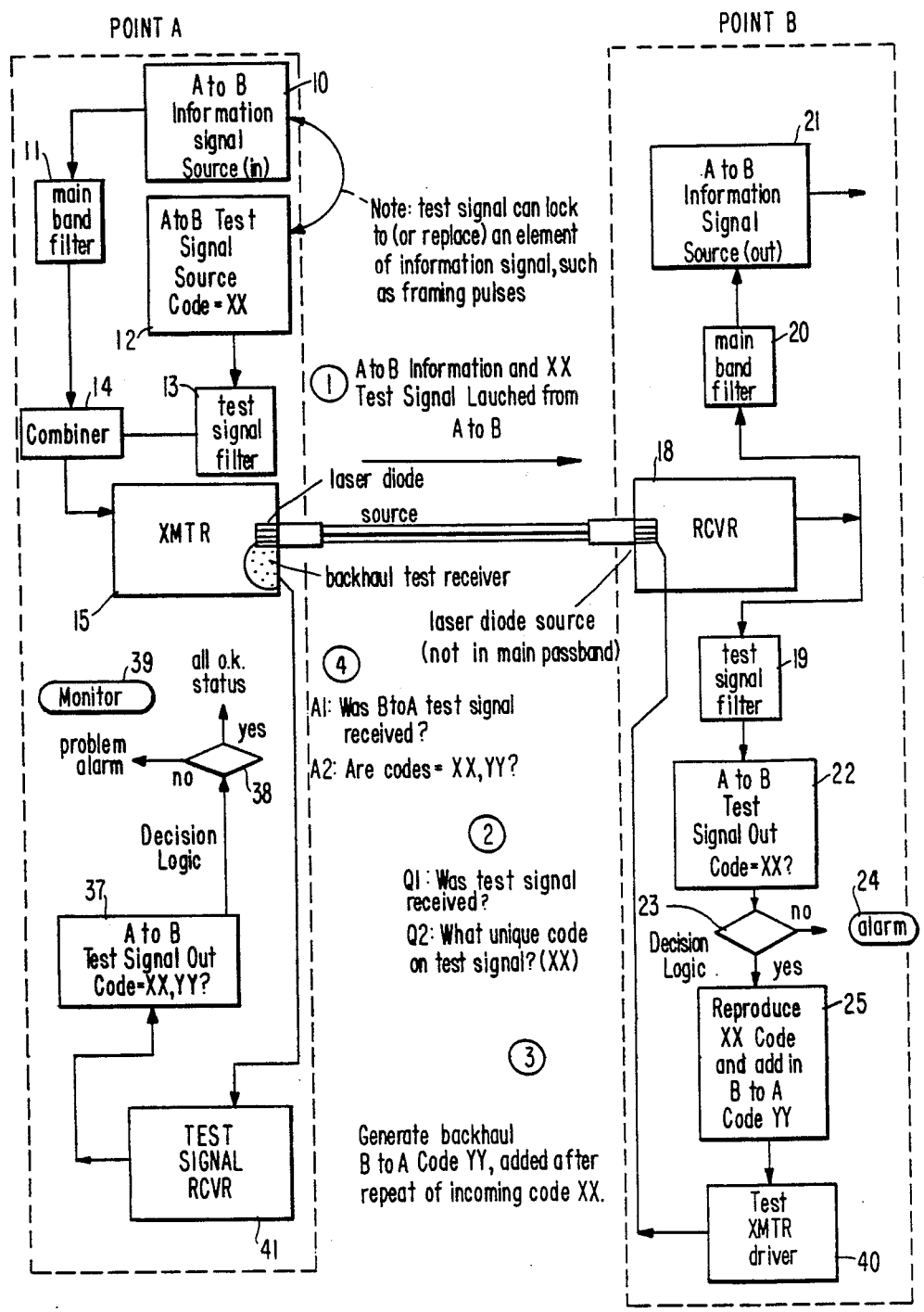
FIG. 4 is a schematic view of a fourth embodiment in accordance with the present invention.

FIG. 4 schematically shows a fourth embodiment where a single optic link is used alone. This embodiment is similar to the second embodiment in that both have a receiver and transmitter and an optic link therebetween. Both embodiments transmit a test signal at low power and do not increase the power for transmitting information until successful reception of the test signal through the optic link is detected.

Components described but not shown in the second embodiment of FIG. 2 can be found in the fourth embodiment of FIG. 4 and are arranged in a like manner. The operating procedure is as follows:

Send test signal (only) using the transmitter operating at low power, from Point A to Point B on the fiber, using coding sequence XX as an identifier.

When test signal (coded XX) is received at Point B, since XX is the expected code from the Point A test signal source, then a new test signal is generated (which contains the received XX sequence and a YY sequence unique to point B). This new test signal is then sent by the Point B test transmitter driver and the laser diode source at low power to Point A on the second fiber.

Reception of the new test signal containing XX and YY sequences at Point A using the backhaul test receiver indicates that the transmitter equipment at Point A is connected to the fiber which is in turn connected to the desired receiver equipment at Point B, and that the test transmitter driver equipment at Point B is connected to the laser diode (operating at an optical wavelength not in the main information passband of the transmitter at Point A). This laser diode is in turn connected to the desired receiver equipment at Point A by the fiber, so that the entire information link is correctly assembled and functioning.

Since the link is correctly assembled and functioning as expected, the transmitter at Point A may now go to full power and begin to transmit the A to B information signal.

Note that the test signal XX will continue to be sent on the fiber along with the A to B information signal. If the code sequence XX, YY should not be received at the monitor at Point A, an alarm will be made. The Point A transmitter will immediately go to low power, sending out only the XX test sequence. When the XX test signal is not received at Point B, an alarm will be made at that location. Should the fault in test signal transmission be caused by a user inadvertently trying to inspect the link, such low power from the transmitter or on the fiber will not be sufficient to cause eye damage.

The components of the embodiment which are the same as those in the third embodiment are numbered the same and operate in a like manner. The only difference is that the backhaul transmitter and receiver in the third embodiment (and accompanying filters, etc.) are replaced by the test transmitter driver 40 and test signal receiver 41 as shown.

It should also be noted that for all the embodiments, the test signal can lock to or replace an element of the information signal, such as framing pulses.

An A to B information signal source 10 generates an information signal which is filtered by a main band filter 11 to eliminate extraneous noise. An A to B test signal source 12 generates a test signal which is filtered by a test signal filter 13. The test signal is coded with an equipment code, e.g. XX. Both signals are transmitted to a combiner 14 which combines the signals and sends the resulting combination signal to the transmitter 15.

Depending upon whether successful reception of the test signal has taken place, the laser diode source 16 is operated either at low-power (capable of only transmitting the test signal) or high power (capable of transmitting both the information and test signals).

Transmission of light wavelengths from the laser diode is through a primary fiber optic link 17 to a receiver 18. After leaving the receiver 18, the combination signal is filtered by test filter 19 and main band filter 20.

While the foregoing description and drawings represent the preferred embodiments of the present invention, it will be understood that various changes and modifications may be made without departing from the spirit and scope of the present invention.

What is claimed is:

1. An apparatus for checking continuity of optic transmission, comprising;
    means for transmitting information optically;

means for receiving information from said transmission means;

means for detecting that said transmission means and said receiving means are in communication with each other so as to enable optical transmission therebetween, said detecting means including means for effecting transmission of a test signal from said transmitting means to said receiving means at a power level which is lower than that required for transmitting said information, said detecting means detecting successful reception of said test signal by said receiving means; and means for sending back a backhaul signal to said transmitting means in response to detection of said successful reception of the test signal by said receiving means.

2. An apparatus according to claim 1, wherein said test signal contains information for controlling at least one of said transmitting means and said receiving means.

3. An apparatus according to claim 1, wherein said detecting means codes said backhaul signal to differ from a back reflection of said information from said receiving means back to said transmitting means.

4. An apparatus according to claim 1, wherein said transmitting means transmits said information within a predetermined range of wavelengths, and backhaul signal having a wavelength outside of said predetermined range.

5. An apparatus according to claim 1, wherein said transmitting means includes a light emitting source, said detecting means including means responsive to a cessation of said backhaul signal for reducing a power level of said light emitting source and for indicating that said transmitting means and said receiving means are out of communication with each other.

6. An apparatus according to claim 1, wherein said transmitting means transmits said information within a predetermined backwidth, said detecting means effecting said transmission of said test signal so that said test signal has a band outside of said predetermined bandwidth.

7. An apparatus according to claim 6, wherein said transmitting means and said emitting means share a common light emitting source, said detecting means including means for powering said common light emitting source at a lower power level for effecting transmission of said test signal than is required for transmitting said information.

8. An apparatus according to claim 7, wherein said detecting means detects successful reception of said test signal by said receiving means; further comprising:

means for maintaining said low power at least until said successful reception of the test signal is detected.

9. An apparatus according to claim 1, wherein said test signal contains frame information signals, said receiving means including test signal receiving means for detecting a cessation of said frame information signals.

10. An apparatus according to claim 9, wherein test signal receiving means includes means for preventing spurious framing information from being sent after detecting said cessation of said frame information signals.

11. An apparatus according to claim 1, wherein said detecting means codes said test signal and said backhaul signal to include codes of respective equipment chassis serial numbers.

12. An apparatus according to claim 11, wherein said detecting means also codes said backhaul signal with said equipment chassis serial number coded in said test signal.

13. A method for checking continuity of optic transmission, comprising the steps of;

transmitting information optically from a transmitting means;

receiving the transmitted information by a receiving means;

detecting that the transmitted information has been received, the step of detecting including effecting transmission of a test signal at a power level which is lower than that required for transmitting said information; and sending back a backhaul signal to said transmitting means in response to a detection of successful reception of the test signal.

14. A method according to claim 13, further comprising:

coding the backhaul signal to differ from a back reflection of the information.

15. A method according to claim 13, wherein the step of transmitting includes transmitting the information within a predetermined range of wavelengths, the step of sending backing including sending back the backhaul signal which has a wavelength outside of the predetermined range.

16. A method according to claim 13, wherein the step of transmitting includes emitting light, the step of detecting including reducing a power level of the emitted light in response to a cessation of the backhaul signal and indicating that the information being transmitted is no longer being received.

17. A method according to claim 13, wherein the step of transmitting includes transmitting the information within a predetermined bandwidth, the step of detecting including effecting the transmission of the test signal so that the test signal has a band outside of the predetermined bandwidth.

18. A method according to claim 17, wherein the step of detecting including powering a light emitting source at a lower power level for effecting transmission of the test signal than is required for transmitting the information.

19. A method according to claim 18, wherein the step of detecting includes detecting successful reception of said test signal; further comprising the step of:

maintaining the low power at least until the successful reception of the test signal is detected.

20. A method according to claim 13, wherein said test signal contains frame information signals, further comprising detecting a cessation of receipt said frame information signals.

21. A method according to claim 20, further comprising preventing spurious framing information from being sent after detecting said cessation of said frame information signals.

22. A method according to claim 14, further comprising:

coding the test signal and the backhaul signal to include codes of respective equipment chassis serial numbers.

23. A method according to claim 22, wherein the step of coding also includes coding the backhaul signal with the equipment chassis serial number coded in said test signal.

* * * * *